Dec. 14, 1965   H. F. GORHAM   3,222,812
FISH LINE GUIDE

Filed June 29, 1964   2 Sheets-Sheet 1

INVENTOR.
HAROLD F. GORHAM

BY
ATTORNEYS

Dec. 14, 1965  H. F. GORHAM  3,222,812
FISH LINE GUIDE

Filed June 29, 1964  2 Sheets-Sheet 2

INVENTOR.
HAROLD F. GORHAM
BY
ATTORNEYS

United States Patent Office 3,222,812
Patented Dec. 14, 1965

3,222,812
FISH LINE GUIDE
Harold F. Gorham, 102 Highland, National City, Calif.
Filed June 29, 1964, Ser. No. 378,751
1 Claim. (Cl. 43—24)

The present invention is a continuation-in-part of my copending application Serial No. 362,828, filed April 27, 1964, and now abandoned. The present invention relates to a line guide for a fishing rod of the casting rod type.

The line guide of the present invention comprises a pair of elongated bases which extend longitudinally of one another and are spaced from one another along the rod. These bases are secured to the rod in any suitable manner, as by encircling them and the rod with threads. These bases support a loop and pulley assembly. The fishing line bears upon the pulley when tension is applied to the line. The smallest loop nearest the end of a rod should have an inside diameter of at least three-sixteenth of an inch and the largest loop nearest the handle should preferably have an inside diameter of over an inch.

Two pairs of arms, which are formed integrally with one another and integrally with the bases, connect the loop and pulley assembly with the bases. One pair of arms, which extend outwardly from one of the bases, is welded to one side of the loop and the other pair of arms, which extend outwardly from the other base, is welded to the opposite side of the loop.

In one embodiment of the invention, the pulley is disposed intermediate the loop and the fishing rod, and in another embodiment, the loop is interposed between the pulley and the fishing rod. The former is preferable for fishing rods when an old style reel is used, and the latter is preferable when a "spinner" type reel is used.

Other features and advantages of the present invention will be apparent from the following description, reference being had to the accompanying drawings wherein preferred embodiments of the invention are illustrated.

Figure 1:
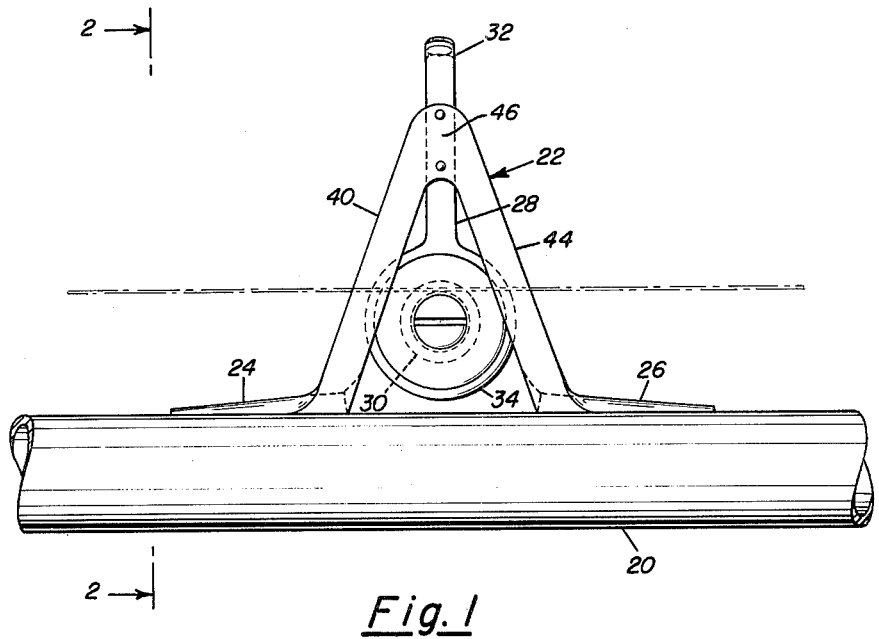
FIG. 1 is a fragmentary side view of a fishing rod showing one embodiment of the invention attached thereto, that embodiment being used when the old style reel is employed.
Figure 2:
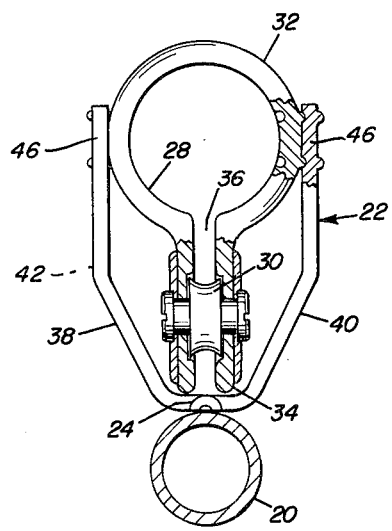
FIG. 2 is a view looking in the direction of arrow 2—2 of FIG. 1, part of the support of the pulley and the pulley being shown in section.

Referring more in detail to the drawings, FIGS. 1 and 2, a fragment of an intermediate section of a fishing reel is shown at 20. The line guide is shown at 22. It comprises two elongated bases 24 and 26. The bases support a pulley and line loop assembly 28, including a pulley 30 and a circularly shaped loop 32. The material forming the loop is provided with parallel sections 34 for supporting the pulley. These sections are spaced from one another to provide a fish line receiving gap 36 interconnecting the periphery of the pulley and the interior of the loop. The pulley and supports therefor are more clearly described in my Letters Patent No. 3,058,255, issued October 16, 1962.

In addition to the bases 24 and 26, the line guide includes two pairs of arms, all four of the arms being formed integrally with one another and with the bases 24 and 26. Arms 44 and 40 are of V-shape and branch outwardly from bases 24 and 26 and are welded to one side of the loop 32, and arms 42 and 38 are of V-shape and branch outwardly from bases 24 and 26 and are welded to the opposite side of the loop.

Figure 3:
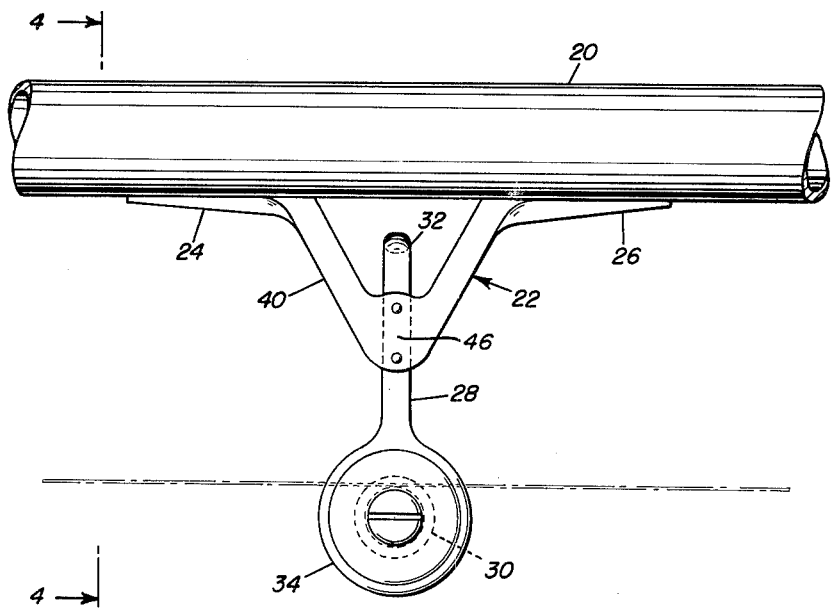
FIG. 3 is a fragmentary side view of a fishing rod showing another embodiment of the invention attached thereto, that embodiment being used when a spinner type reel is employed.
Figure 4:
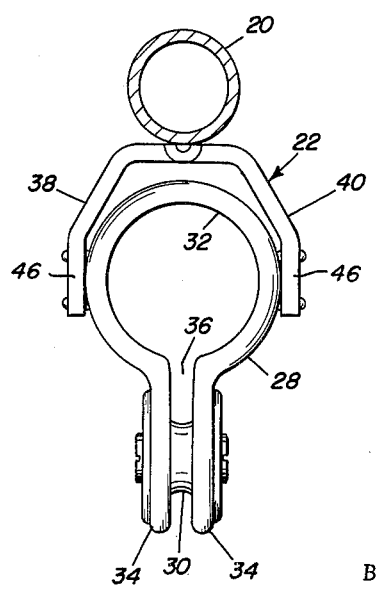
FIG. 4 is a view looking in the direction of arrows 4—4 of FIG. 3.

In FIGS. 1 and 2 the pulley is interposed between the loop 32 and the bases and rod, and in FIGS. 3 and 4, the loop is interposed between the pulley and the bases and rod. FIGS. 1 and 2 show the use of the invention when applied to a casting rod using an old style reel, while FIGS. 3 and 4 show the use of the invention when applied to a casting rod using a spinner type reel.

The arms 38, 40, 42 and 44 are formed of resilient material so that they resiliently embrace the loop 32. As is more clearly shown in FIG. 2, each arm is provided with an elongated section 46 which extends longitudinally alongside of the periphery of the loop, one section being disposed on one side of the loop and the other section being disposed on the opposite side of the loop, and the arms and loops are provided with interfitting semi-circular recesses and semi-circular bulges for retaining the loops in position prior to welding the respective loop to the arms. The welding is effected intermediate and aligned with the pairs of recesses of an arm, i.e., midway of a pair of recesses and a pair of bulges. Thus elongated securing surfaces are provided between the round periphery of the loop and the supporting arms therefor to insure adequate supports for the loop.

The word "welded" as herein used, also includes soldered, brazed, etc.

While the forms of embodiment herein shown and described, constitute preferred forms, it is to be understood that other forms may be adopted falling within the scope of the claim that follows.

I claim:

In combination with a fishing rod, a line guide comprising:

(a) a pair of elongated bases attached to the rod, said bases extending longitudinally of one another and spaced from one another along said rod, (b) a pulley, (c) loop guide means for supporting said pulley, said loop comprising a substantially circular member having upper, lower and side portions, said lower portion having a pair of depending arms supporting said pulley, said side portions each having a pair of circumferentially displaced bulges extending outwardly, (d) means for attaching said loop guide means to said bases including:

(1) a first pair of resilient arms formed in a V-shape and integral with said bases, said first pair of arms having the juncture of the V-extending adjacent one of said side portions, said juncture having a pair of recesses seating said pair of bulges on said one side,
(2) a second pair of resilient arms formed in a V-shape and integral with said bases, said second pair of arms having the juncture of the V extending adjacent the other of said side portions, said juncture having a pair of recesses seating said pair of bulges on said other side,
(3) said cooperating pairs of recesses and bulges being mated and pressed together, and said loop being welded to said arms adjacent said bulges and recesses.

References Cited by the Examiner
UNITED STATES PATENTS

| | | | |
|---|---|---|---|
| 958,775 | 5/1910 | Shakespeare | 43—24 |
| 1,627,643 | 5/1927 | Haberl | 43—24 |
| 1,703,037 | 2/1929 | Heck | 29—470.5 |
| 1,995,616 | 3/1935 | Kamack | 29—470.5 X |
| 3,058,254 | 11/1962 | Gorham | 43—24 |

SAMUEL KOREN, *Primary Examiner.*
ABRAHAM G. STONE, *Examiner.*
R. L. HOLLISTER, *Assistant Examiner.*